UNITED STATES PATENT OFFICE.

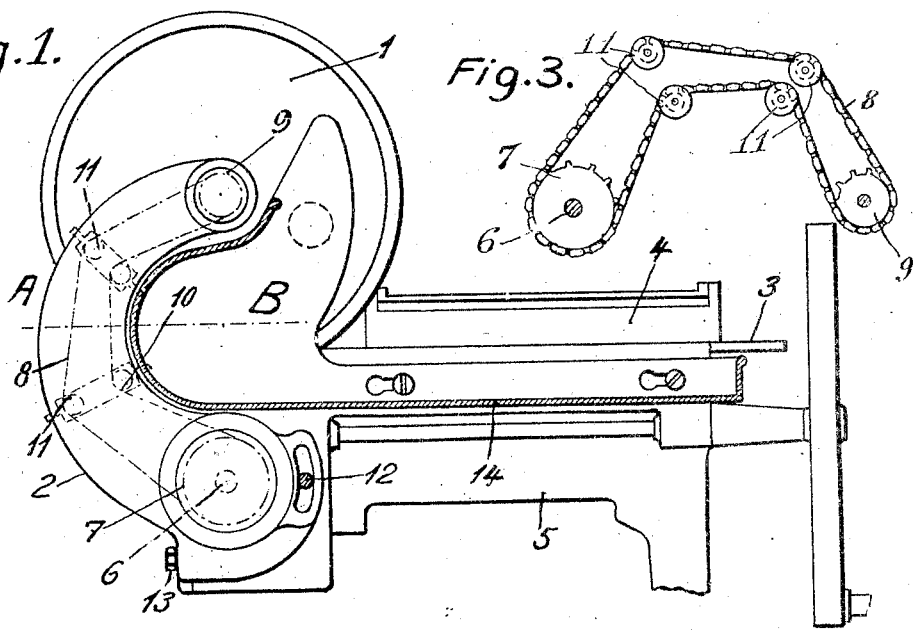
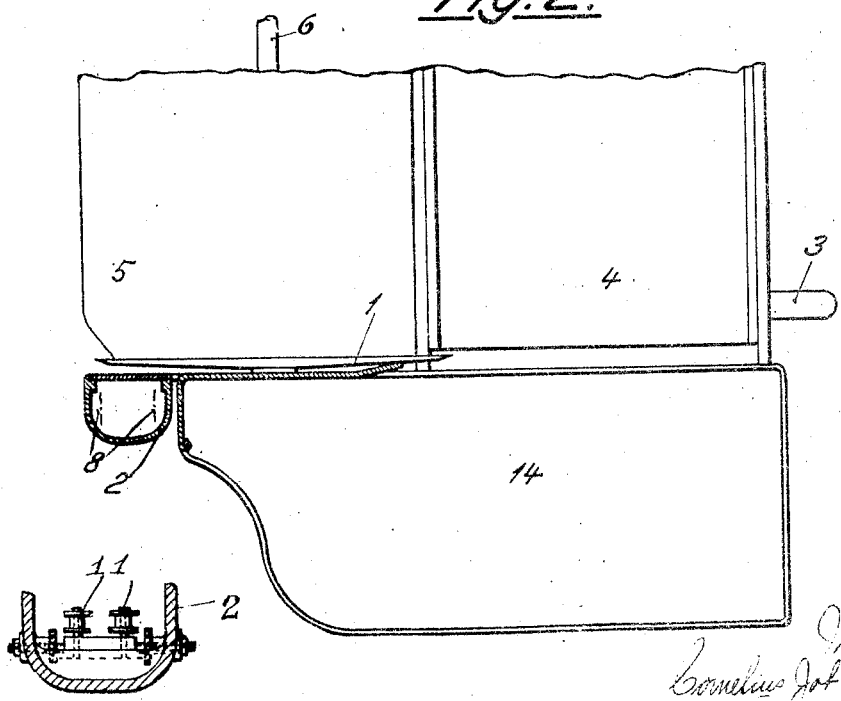

CORNELIUS JOB LENSVELT, OF ZURICH, SWITZERLAND.

MEAT-SLICING MACHINE.

1,379,410.   Specification of Letters Patent.   Patented May 24, 1921.

Application filed July 19, 1920. Serial No. 397,337.

*To all whom it may concern:*

Be it known that I, CORNELIUS JOB LENSVELT, merchant, a subject of the Queen of Netherlands, residing at Hadlaubstrasse 3, Zurich, Switzerland, have invented certain new and useful Improvements in Meat-Slicing Machines, of which the following is a specification.

The present invention relates to a new and improved meat-slicing machine of the type in which a table carrying the meat to be sliced is reciprocated to and from a vertical rotating circular knife. In all the meat slicing machines of this kind the bracket in which the circular knife is journaled prevents the arrangement of a meat-plate or the like in such a manner that the cut slices of a large piece of meat are fully and neatly deposited on the plate without further handling the slices by the operator of the machine. This disadvantage is very apparent when the machine is used in the kitchen to cut meat while it is hot. If the slices of hot meat are to be handled to place them on a plate they get cool and unpalatable and get an unsightly appearance.

A further drawback of the known slicing machines consists in that a circular knife, having a diameter comparatively small can not cut fully through a large piece of meat.

The object of the invention is to obviate the drawbacks aforesaid and I attain this object by providing a bracket for the circular knife which leaves plenty of space to place a plate or disk adapted to receive the slices neatly in front of the circular knife. The bracket is adjustable with reference to the reciprocating table in such a manner that a knife with reduced diameter cuts the slice fully off from large pieces of meat.

Other objects of the invention relate to the provision of minor parts coöperating with the bracket above noted and to details of construction, all of which will be more clearly set forth in the following specification.

With the above objects in view the invention resides in the parts and combination of parts hereinafter described, and particularly set forth in the claims appended hereto.

In order that my invention may be clearly understood, I have illustrated the same in the accompanying drawings in a diagrammatical manner.

Figure 1 shows a front elevation of the meat slicing machine parts being shown in section.

Fig. 2 is a section on line A—B of Fig. 1.

Fig. 3 is a detail elevation, partly in section, of the driving chain and its connection.

Fig. 4 is a detail sectional view, through the bracket arm 2 and also on the plane indicated by the line A—B of Fig. 1.

In the drawing 1 denotes the circular knife which rotates in a vertical plane and the arbor of which is rotatably mounted in the free end of a bracket arm 2. On a fixed guide 3 of the machine a slide 4 is slidably mounted. On the slide 4 the meat to be sliced is fixed in the well known manner by means of a clamping device and the slide is fed automatically toward the knife, the feed being adjustable and is made according to the desired thickness of the slice. The arm 2′ of the bracket is bent as shown in Fig. 1, the lower end thereof is adjustably arranged on the frame of the machine and is rigidly fixed thereto in the desired position by means of screws. The bracket 2′ is hollow and is provided with adjustable chain rollers 10, 11 which may be adjusted in slots of the bracket. A chain 8 is provided within the bracket running over the chain wheel 7 fixed to shaft 6, the guide rollers 10, 11 and a chain wheel 9 fixed to the arbor on which the knife 1 is fixed. The chain and the chain wheels are within the hollow bracket. The rollers 10 are used for tightening and guiding the chain. The bracket is fixed to the frame 5 by means of screws 12, 13 its position with reference to the slide 4 may be altered in such a manner that the axis of the circular knife 1 takes for instance the position shown in dotted lines in Fig. 1. If the diameter of the knife 1 is reduced the bracket is adjusted in such a manner that the outer edge of the slide 4 and therefore the meat placed thereon passes fully the cutting edge of the knife 1 and the slices are fully severed from the piece of meat placed on the slide 4.

On the frame 5 a sheet metal plate 14 is fixed adapted to receive the slices cut from the meat. The plate 14 is provided with an arcuate portion following closely the bend of the bracket. Space is thus gained in front of the circular knife 1 which may be used for placing a large meat dish or meat plate on the plate 14 to receive the slices. The slices are placed correctly and neatly on the plate ready to be brought on the table.

The means for fixing the bracket on to the frame 5 may be of any suitable construction and I do not wish to confine my invention to the particular construction of the bracket and to the plate 14 as various changes in form and arrangement may be made without departing from the spirit of my invention.

What I claim as new and wish to secure by Letters Patent is:

1. A meat slicing machine comprising in combination a frame, a reciprocating slide on said frame adapted to receive the meat to be sliced, a rotary knife, means to reciprocate said slide and to rotate said knife, a bracket having a journal in which said knife rotates, said bracket having an arcuated form, a rest adapted to receive a plate shaped in conformity to said bracket.

2. A meat slicing machine comprising in combination a frame, a reciprocating slide on said frame adapted to receive the meat to be sliced, a rotary knife, means to reciprocate said slide and to rotate said knife, a bracket in which said knife rotates, said bracket having an arcuated form, a plate shaped in conformity to said bracket, means to adjust the bracket with reference to the reciprocating slide.

3. A meat slicing machine comprising in combination a frame, a reciprocating slide on said frame adapted to receive the meat to be sliced, a rotary knife, means to reciprocate said slide and to rotate said knife, a bracket in which said knife rotates, said bracket having an arcuated form, a plate adapted to receive a dish on which the slices are placed said plate being shaped in conformity to said bracket, means to adjust the bracket with reference to the reciprocating slide, said bracket being hollow to receive the driving means for said knife.

4. A meat slicing machine comprising in combination a frame, a reciprocating slide on said frame adapted to receive the meat to be sliced, a rotary knife, means to reciprocate said slide and to rotate said knife, a bracket in which said knife rotates, said bracket having an arcuated from, a plate shaped in conformity to said bracket, means to adjust the bracket with reference to the reciprocating slide, a hollow in said bracket to receive the driving chain for said knife and means within said hollow bracket to tighten the chain substantially as shown and for the purpose set forth.

In witness whereof I affix my signature.

CORNELIUS JOB LENSVELT.